D. STONE.
Gang Plow.
No. 43,804.
Patented Aug. 9, 1864.
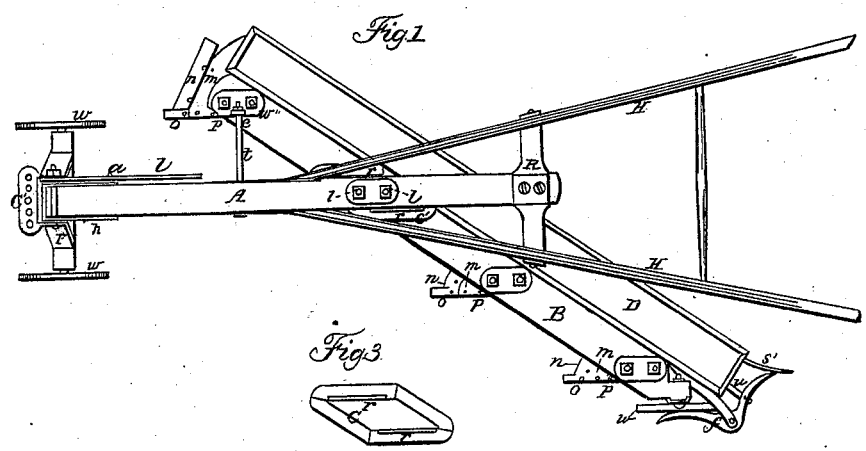
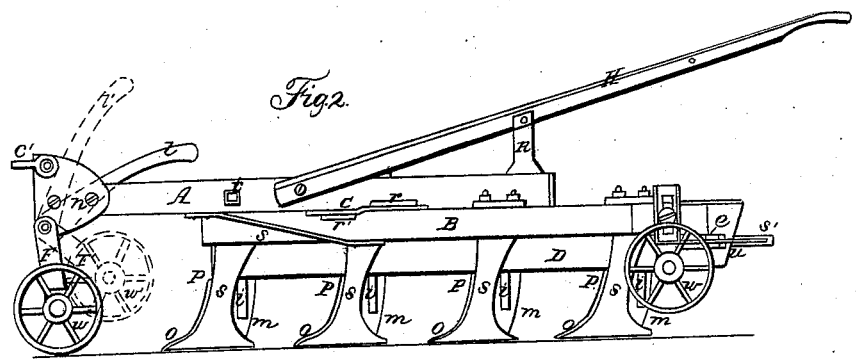
Witnesses:
Wm S Loughborough
Aab C Billings
Inventor:
Draper Stone

UNITED STATES PATENT OFFICE.

DRAPER STONE, OF PITTSFORD, NEW YORK.

GANG-PLOW AND SEEDER.

Specification forming part of Letters Patent No. 43,804, dated August 9, 1864.

*To all whom it may concern:*

Be it known that I, DRAPER STONE, of Pittsford, in the county of Monroe and State of New York, have invented certain new and useful Improvements in Gang-Plows and Seeders; and I do hereby declare that the following is a full, clear, and exact description thereof, reference being had to the accompanying drawings, making a part of this specification, in which—

Figure 1 is a top view or plan of the improvement. Fig. 2 is a side elevation of the same. Fig. 3 is a detached view of the joint plate or collar C.

Similar letters of reference indicate corresponding parts in the several figures.

The principal features of this invention consist in simplifying the construction of the frames of gang-plows, and in attaching to them a seeding apparatus in such a manner as to so deposit the grain in the furrows behind the plows that each succeeding plow shall cover the seed deposited before it and to a uniform depth.

To enable others to make and use my invention, I will proceed to describe it.

A in the drawings represents the draft-beam, to the front end of which is fixed the head $h$. The clevis C' and the frame F of the front truck-wheels, $w$, are hinged to this head. One of the standards of this frame is lengthened and bent so as to form the hand-lever $l$, by which the position of the truck-frame is regulated, and it is retained in the desired adjustment by an ordinary detent or locking-pin, $a$, of the lever catching into the holes in the side of the head $h$, made for the purpose. The handles H are supported by the rest R, their front ends being attached to the sides of the beam A.

The beam B, to which the plows are attached, is connected to beam A by the bolts $b$, Fig. 1. These bolts also hold one of the plows and one end of the strap or brace-rod S, the other end being bolted to the beam A. This strap counteracts the tendency of the plow-beam B to twist or roll by the pressure against the plows.

The joint plate or collar, which is placed between the beams, is provided on the upper side with two ribs, $r$, which clasp the sides of the beam A, and on the lower side with two similar ribs, $r'$, that clasp the plow-beam B. This peculiar manner of joining the beams avoids the necessity of cutting diagonal gains across them, as heretofore practiced, leaving the full strength of the timber in both. The relative position horizontally of the beams A and B is rendered still more secure by the tie-bolt $t$, which passes through the beam A, and connects at the other end with the lug $e$ of the washer $w''$ by a screw-nut.

Each plow P is composed of a cast-shank, $s$, plate-steel mold-board $m$, share $n$, and point $o$, each made separate and secured to projections cast on the shank $s$ for that purpose by screws or otherwise, so as to be removed at any time for sharpening. This is all important in gang-plows for always being used in light pulverized ground, the soil having been previously prepared by the ordinary single plow. If the point and the edge of the share are not kept very sharp, grass, roots, and other similar substances will catch on them and prevent the plows from clearing. This is particularly true of the edge of the share.

The seeding attachment D is of ordinary construction, and may be connected to the rear side of the plow-beam B and rest upon the upper edge of the mold-boards $m$.

The discharging device is operated by the rod $u$ and double-arm lever $f$, which latter is pressed alternately against and between the spokes of the rear truck-wheel, $w$, as it revolves by the spring $s'$, which is fixed to the rear side of the grain-box D.

The delivery-tubes $i$ should reach to within six or eight inches of the bottom of the plows, or to such point as, according to their size and shape, will insure the scattering of the grain across the entire width, or nearly so, of the bottom of the furrow, thus acting as a broadcast sower, and with this great advantage over all other broadcast seeding-machines that each succeeding plow covers all the grain deposited in the furrow of the preceding one and to a uniform depth.

If desirable, the delivery-tube of the left-hand plow may be stopped while passing the last time across the field, that there may be no grain left uncovered.

When the forward truck and lever, $l$, are in their present position the plows are thrown out of the ground; but when they are in the position indicated by the dotted lines $l'$, F', and $w'$ they are allowed to enter.

The depth is regulated by the forward and rear truck-wheels $w$, the latter being adjusted in the usual manner.

By this construction of gang-plow frames very much of their cumbersome weight as heretofore made is dispensed with.

What I claim as my invention, and desire to secure by Letters Patent, is—

The combination and relative arrangement of the draft-beam A, diagonal plow-beam B, ribbed joint-plate C, tie-bolt $t$, (one end of which is connected to the ear $e$ of the washer-plate $w''$,) with the seed-box D and its appurtenances, all being arranged and operating conjointly, in the manner and for the purposes set forth.

DRAPER STONE.

Witnesses:
   WM. S. LOUGHBOROUGH,
   ASA H. BILLINGS.